2,867,539

PHTHALOCYANINE PIGMENTS

Robert E. Brouillard, Westfield, and Leon Katz, Springfield, N. J., assignors to General Aniline & Film Corporation, New York, N. Y., a corporation of Delaware No Drawing. Application December 7, 1955
Serial No. 551,528

21 Claims. (Cl. 106—288)

This invention relates to improved phthalocyanine blue pigments, and a method for their manufacture.

Phthalocyanine blue pigments are various physical forms of the copper derivatives of tetrabenzotetrazoporphine which may contain small amounts of chlorine. These pigments have great commercial significance because of purity of shade and outstanding general fastness properties. They do, however, suffer from certain deficiencies which have limited more general utilization.

One of the deficiencies of phthalocyanine blue pigments involves their tendency to form crystals on exposure to aromatic solvents. Thus, in paints, enamels, and lacquers containing aromatic solvents the strong brilliant blue shade of the products immediately after manufacture is not stable and degenerates to weak and dull shades on ageing. The pigments have therefore been characterized as having poor "can stability." This deficiency has been minimized and in some cases avoided completely by formulating the coating compositions without aromatics. This procedure is generally unsatisfactory since it precludes the use of cheap and versatile solvents.

Another deficiency of phthalocyanine blue pigments is flocculation. Flocculation may be defined as a dispersion failure in which the pigment particles in a coating composition coalesce to give a system of inadequate strength and shade. A paint, enamel or lacquer which flocculates is practically useless since the amount of mechanical action applied at the point of application will to a large degree determine the shade and strength developed. Thus, a brushing application will vary the strength depending upon the amount of localized work done and will normally give a striated and streaky finish. A spray application of a flocculating composition usually gives high strength and adequate shade because of the deflocculation effect of spraying. The sprayed film can reflocculate however if the film is thick or if the speed with which it sets is slow as contrasted with the rate at which flocculation occurs.

Partial solutions to the problems of crystallization and flocculation of phthalocyanine blues have been described. Thus, the physical characteristics of the pigmentary particles have been modified so as to minimize surface forces which result in flocculation and solubility effects which convert very small particles to large crystals. The method (U. S. P. 2,486,351) used to achieve this result involves grinding the phthalocyanine blue with a crystallizing solvent and extractable grinding aid such as salt. The product obtained shows stability to aromatic solvents and does not tend to flocculate but a profound shift in shade toward the green occurs in processing. This shade shift excludes the product from many applications and is thus very undesirable. Another and perhaps even more drastic disadvantage of this mode of operation lies in processing economies. The operating characteristics of the process are such that long time cycles are involved in expensive explosion proof equipment, a solvent recovery system must be available, and special care and precautions must be exercised to eliminate all traces of solvent as well as salt from the final product.

Another method used to control crystallization and flocculation of phthalocyanine blue pigments involves incorporation of various tin phthalocyanines with chlorine containing copper phthalocyanine (U. S. P. 2,476,950-1, 2). This method suffers from serious disadvantages because the tin phthalocyanine cannot be acid pasted in large scale operations with the copper phthalocyanine but must be salt ground separately much as indicated above. The above described salt grinding disadvantages are therefore applicable. Furthermore, the conventional method for preparing tin phthalocyanine gives low yields which leads to disadvantageous costs.

A method has been described for control of flocculation (U. S. P. 2,526,345) in which a small amount of monosulfonated copper phthalocyanine is blended with copper phthalocyanine. This procedure is deficient because it does not stabilize to crystallization. In addition to this, the manufacture of a monosulfo copper phthalocyanine is a very difficult matter in large scale operation. The difficulty lies in attaining the correct degree of sulfonation. When less than one sulfo group is introduced insufficient stabilization occurs. When more than one sulfo group is present in the stabilizer, water sensitivity results and the product loses the water fastness which is characteristic of phthalocyanine blue.

Another method which has been proposed to overcome flocculation without modifying the crystallizing characteristics involves coating the pigment with aluminum benzoate (U. S. P. 2,327,472). This method suffers from the disadvantage that the resulting product contains a relatively small amount of color because of the large percentage of stabilizer needed. Furthermore, the stabilizer may in some cases be reactive and adversely affect the properties of the finished coating composition.

It is an object of this invention to produce a phthalocyanine blue pigment which is stable to crystallization and flocculation when incorporated into a surface coating composition. Other objects and advantages will appear as the description proceeds.

The attainment of the above objects is made possible by our discovery that phthalocyanine blue pigments may be converted to a non-crystallizing and non-flocculating form by incorporating therein small amounts of alkaline earth metal salts of sulfonated zinc phthalocyanine.

Sulfonated zinc phthalocyanine and its alkaline earth metal salts may be prepared in any manner well known in the art. Thus, it may be prepared by co-condensation of phthalic anhydride and sulfonated phthalic anhydride with a zinc salt in any of several well described methods. We prefer, however, to sulfonate preformed zinc phthalocyanine. The sulfonation is easily performed with concentrated sulfuric acid or oleum and is not particularly sensitive. Optimum results are obtained if the stabilizer employed in the instant invention contains about 1.25 to 2.5 sulfonic acid groups per zinc phthalocyanine molecule. If the stabilizer contains less than about 1.25 sulfonic acid groups, there is a marked tendency to bleed in organic solvents and the degree of stabilization is markedly diminished. If the stabilizer contains more than about 2.5 sulfonic acid groups, no appreciable advantage is realized and water sensitivity is established.

The alkaline earth metal salts of sulfonated zinc phthalocyanine are readily prepared in known manner by treatment of the sulfonated zinc phthalocyanine with soluble alkaline earth metal salts such as the chlorides, bromides, iodides and the like of barium, magnesium and calcium. This salt formation is preferably carried out in an aqueous medium, from which the phthalocyanine lake precipitates. The salt formation is a metathetical reaction, and an amount of the alkaline earth metal salt must be employed which is sufficient to form the alkaline earth metal salt of the sulfonic acid groups present in the zinc phthalocyanine. In order to insure completeness of salt formation, an amount of soluble alkaline earth metal salt in excess of that theoretically required is usually employed. The sulfonated zinc phthalocyanine may be in the form of the free acid or in the form of its alkali metal salts, for example as produced during its process of manufacture by drowning of the sulfonated zinc phthalocyanine in brine.

The alkaline earth metal salts of sulfonated zinc phthalocyanine must be present in the instant compositions to the extent of at least about 0.5%, and may be utilized efficiently in amounts up to about 5% by weight of the copper phthalocyanines. Larger amounts (over 10%) are detrimental in that fastness to light is degraded and a profound change in shade occurs. It is one of the surprising features of this invention that a zinc phthalocyanine derivative which is inherently very fugitive to light may be incorporated into extremely light fast phthalocyanine blue pigments without showing any noticeable decrease in light fastness of the latter pigments.

The chlorine content of the copper phthalocyanine blue to be stabilized is not critical. Our process is equally applicable to copper phthalocyanine which does not contain chlorine or to a copper phthalocyanine whose chlorine content is as high as 10–15% by weight. Since trade preferences are for the reddest possible shades and the presence of chlorine tends to give greener shades, we prefer to use copper phthalocyanines which are chlorine-free or which contain only small amounts of chlorine. Brominated copper phthalocyanine may also be employed. Substituents other than chlorine or bromine may also be present in the copper phthalocyanine molecule. These substituents have only a minor influence on the crystallization and flocculation characteristics of the final product. Their only influence is to modify the shade slightly.

Although the alkaline earth metal salts of sulfonated zinc phthalocyanine may be blended directly with the copper phthalocyanine in dry or wet form, we have found that it is preferable to form an aqueous slurry of the copper phthalocyanine and sulfonated zinc phthalocyanine and to then form the alkaline earth metal salt of the sulfonated zinc phthalocyanine in situ by addition of a soluble alkaline earth metal salt, preferably in the form of an aqueous solution, to the slurry. After isolation of the resulting pigment mixture by filtration, the filter cake may be utilized as such or converted to powders by conventional techniques.

The following examples will serve to more fully illustrate the invention and it is understood that the specific conditions and proportions recited therein are not given as limitations but are only illustrative of the preferred method of performing the process. Parts are by weight unless otherwise indicated.

*Example 1*

| | Parts |
|---|---|
| Copper phthalocyanine | 100 |
| Sulfonated zinc phthalocyanine | 2.5 |
| Barium chloride | 1.5 |

The respective phthalocyanines were utilized as aqueous presscakes. The barium chloride was dissolved in 10 parts of water. Into a 3-liter beaker equipped with agitator were charged the copper phthalocyanine (analyzing 4.5–4.7% Cl) as an 18% presscake, 1000 parts of water and the sulfonated zinc phthalocyanine (analyzing 6.9% S). The slurry was thoroughly mixed and a solution of 1.5 parts of barium chloride in 10 parts of water added. Mixing was continued until the laking operation was complete. Filtration and washing yielded a presscake containing a phthalocyanine composition which did not flocculate or crystallize in several well-known tests designed for flocculation and crystallization studies. The presscake may be used as such or may be converted by conventional means to soft powders.

*Example 2*

| | Parts |
|---|---|
| Copper phthalocyanine (1.8–2.5% Cl) | 100 |
| Sulfonated zinc phthalocyanine (6.75% S) | 5.0 |
| Calcium chloride | 5.0 |

By operating in a manner as described in Example 1, a presscake is obtained which is exceptionally resistant to flocculation and crystallization in conventional surface coating systems. It must be understood that calcium chloride can be replaced by other alkaline earth salts such as barium and magnesium.

The products produced by these procedures are characterized by high tinctorial strength of a pleasing pure shade of blue. The pigment retains all the excellent features of copper phthalocyanine and in addition does not have the tendency to crystallize or flocculate. Thus an enamel prepared from this pigment yields the same strength and shade when applied either by spraying or dipping.

Similar results are obtained if the copper phthalocyanine used does not contain chlorine.

This invention has been disclosed with respect to certain preferred embodiments, and various modifications and variations thereof will become obvious to persons skilled in the art. It is to be understood that such modifications and variations are to be included within the spirit and purview of this application and the scope of the appended claims.

We claim:

1. A blue phthalocyanine pigment composition consisting essentially of a copper phthalocyanine and about 0.5 to 5% of an alkaline earth metal salt of sulfonated zinc phthalocyanine, containing about 1.25 to 2.5 sulfonic acid groups per zinc phthalocyanine molecule by weight of said copper phthalocyanine.

2. A blue phthalocyanine pigment composition consisting essentially of a halogenated copper phthalocyanine and about 0.5 to 5% of an alkaline earth metal salt of sulfonated zinc phthalocyanine by weight of said copper phthalocyanine.

3. A composition as defined in claim 1 wherein the alkaline earth metal is barium.

4. A composition as defined in claim 1 wherein the alkaline earth metal is calcium.

5. A composition as defined in claim 1 wherein the alkaline earth metal is magnesium.

6. A blue phthalocyanine pigment composition consisting essentially of chlorinated copper phthalocyanine and about 0.5 to 5% of an alkaline earth metal salt of sulfonated zinc phthalocyanine, containing about 1.25 to 2.5 sulfonic acid groups per zinc phthalocyanine molecule by weight of said chlorinated copper phthalocyanine.

7. A composition as defined in claim 6 wherein the alkaline earth metal is barium.

8. A composition as defined in claim 6 wherein the alkaline earth metal is calcium.

9. A composition as defined in claim 6 wherein the alkaline earth metal is magnesium.

10. A process for the preparation of a water-insoluble blue phthalocyanine pigment composition stable to crystallization and flocculation comprising forming an aqueous slurry containing a copper phthalocyanine and about 0.5 to 5% of sulfonated zinc phthalocyanine, containing about 1.25 to 2.5 sulfonic acid groups per zinc phthalocyanine molecule by weight of said copper phthalocyanine, and then adding to the slurry an aqueous solution containing an amount of an alkaline earth metal salt sufficient to produce the alkaline earth metal salt of the sulfonated zinc phthalocyanine in situ.

11. A process as defined in claim 10 wherein said alkaline earth metal is barium.

12. A process as defined in claim 10 wherein said alkaline earth metal is calcium.

13. A process as defined in claim 10 wherein said alkaline earth metal is magnesium.

14. A process for the preparation of a water-insoluble blue phthalocyanine pigment composition stable to crystallization and flocculation comprising forming an aqueous slurry containing a halogenated copper phthalocyanine and about 0.5 to 5% of sulfonated zinc phthalocyanine, containing about 1.25 to 2.5 sulfonic acid groups per zinc phthalocyanine molecule by weight of said copper phthalocyanine, and then adding to the slurry an aqueous solution containing an amount of an alkaline earth metal salt sufficient to produce the alkaline earth metal salt of the sulfonated zinc phthalocyanine in situ.

15. A process as defined in claim 14 wherein said alkaline earth metal is barium.

16. A process as defined in claim 14 wherein said alkaline earth metal is calcium.

17. A process as defined in claim 14 wherein said alkaline earth metal is magnesium.

18. A process for the preparation of a water-insoluble blue phthalocyanine pigment composition stable to crystallization and flocculation comprising forming an aqueous slurry containing chlorinated copper phthalocyanine and about 0.5 to 5% of sulfonated zinc phthalocyanine, containing about 1.25 to 2.5 sulfonic acid groups per zinc phthalocyanine molecule by weight of said chlorinated copper phthalocyanine, and then adding to the slurry an aqueous solution containing an amount of an alkaline earth metal salt sufficient to produce the alkaline earth metal salt of the sulfonated zinc phthalocyanine in situ.

19. A process as defined in claim 18 wherein the alkaline earth metal is barium.

20. A process as defined in claim 18 wherein the alkaline earth metal is calcium.

21. A process as defined in claim 18 wherein the alkaline earth metal is magnesium.

References Cited in the file of this patent

UNITED STATES PATENTS

| | | |
|---|---|---|
| 2,099,689 | Holzach | Nov. 23, 1937 |
| 2,099,690 | Holzach | Nov. 23, 1937 |
| 2,327,472 | Vesce et al. | Aug. 24, 1943 |
| 2,476,951 | Beard | July 26, 1949 |
| 2,526,345 | Giambalvo | Oct. 17, 1950 |